Patented Aug. 24, 1937

2,091,179

UNITED STATES PATENT OFFICE 2,091,179

PREPARATION OF SALT MIXTURES

Robert Edwin Hulse, Niagara Falls, N. Y., assignor to E. I. du Pont de Nemours & Company, Wilmington, Del., a corporation of Delaware No Drawing. Original application July 29, 1933, Serial No. 682,883. Divided and this application August 29, 1935, Serial No. 38,437

5 Claims. (Cl. 204—21)

This invention relates to a method for the purification of salt mixtures and more specifically to the preparation of a mixture of salt suitable for the production of light metals by fused salt electrolysis.

This application is a divisional of my copending application, Serial No. 682,883, filed July 29, 1933.

In the production of light metals by the electrolysis of fused salt it is common practice to use a mixture of salts rather than a pure fused salt, chiefly in order to obtain a low-melting electrolyte. For example, in the production of sodium by the electrolysis of sodium chloride one or more salts of other metals are added. Thus a commonly used electrolyte for the manufacture of sodium by a fused salt electrolysis consists of a mixture of sodium chloride and calcium chloride. The calcium chloride used for this purpose must be carefully fused to remove all traces of water before its introduction into the electrolytic cell.

When a fused mixture of sodium chloride and calcium chloride is electrolyzed, the sodium produced contains a small amount of calcium. The crude sodium metal, collected from a plurality of electrolytic cells, contains in addition to calcium, oxides and chlorides of these metals. Substantially pure sodium is obtained by filtering the molten crude metal at a temperature at which the calcium is substantially insoluble. The filter residue consists of the oxides and salts, together with large quantities of calcium and sodium.

A proposed process for recovering sodium from a mixture of sodium, calcium and their oxides comprises reacting the mixture with a fused bath containing such quantities of sodium chloride that the calcium reacts with the sodium chloride to set free sodium and form calcium chloride. The liberated sodium is removed from the melt by a gravity method, while the calcium oxide remains in the melt in solution and in suspension. Thus the by-product of this process of recovery comprises a mixture of the excess sodium chloride, calcium chloride and calcium oxide, since practically all of the sodium oxide introduced reacts with the calcium chloride to form sodium chloride and calcium oxide. A certain amount of the calcium oxide, depending upon the concentration of calcium chloride in the mixture, is in solution; the remainder is a finely divided precipitate which will settle out if the molten bath is allowed to stand for a sufficient time without agitation. The bulk of the precipitated oxide may be removed by mechanical means from the melt after settling. The resulting melt, after the addition of more sodium chloride if necessary, may then be used as electrolyte for the fused salt electrolytic production of sodium. However it is difficult to remove all of the precipitated oxide and furthermore a considerable quantity of the oxide remains dissolved in the melt; and the presence of the oxide is generally a disadvantage in the electrolysis process. The oxide, if introduced into the electrolytic cell, causes a liberation of oxygen, thus contaminating the by-product chlorine with oxygen, and furthermore the oxygen set free tends to oxidize graphite or carbon electrodes when these are used in the fused salt electrolysis process. For this reason the salt-oxide mixture has no utility and must be wasted unless the oxide can be removed. Hence, I have sought economical means for removing oxides from such salt-oxide mixtures in order to prepare oxide-free salt mixtures suitable for the fused salt electrolytic production of sodium.

One object of this invention is to provide a method for the removal of calcium oxide from mixtures of sodium chloride and calcium chloride. A further object is to prepare oxide-free, anhydrous salt mixtures suitable for the fused salt electrolytic production of sodium. Other objects will be apparent from the following description of my invention.

In one method of carrying out my invention, a mixture of calcium chloride and alkali metal chloride, containing calcium oxide partly in suspension and partly in solution, is subjected to the action of direct electrical current in a suitable fused salt electrolysis cell, for example, a cell which is suitable for the production of the alkali metal. I prefer to use the type of electrolytic cell described in Downs U. S. Pat. 1,501,756. The mixture, which may contain up to around 20% of calcium oxide, is placed in the cell, fused therein by the action of the electric current or by other suitable means and the cell is then operated in the usual manner. Advantageously, a cell may be selected which is already operating to produce the alkali metal and part of the electrolyte may be removed and replaced with the oxide-containing salt mixture. As the electrolysis proceeds, alkali metal is produced at the cathode and part of the chlorine evolved at the anode reacts with the oxide to produce calcium chloride and liberate oxygen. As known to the art, if the calcium chloride content becomes too high, relatively large amounts of calcium will also be produced in the cell. I prefer to maintain the calcium chloride content sufficiently low so that the minimum amount of calcium is produced.

When an analysis of the salt mixture in the cell shows that the calcium oxide has disappeared or that its concentration has been reduced to the desired extent, a portion of the electrolyte is removed and replaced by a fresh quantity of oxide-containing salt mixture. The portion of electrolyte removed may be transferred to another electrolytic cell where it may be electrolyzed to product alkali metal and oxygen-free chlorine, with the addition of more alkali metal chloride if necessary.

My invention is further illustrated by the following example:

*Example*

A Downs-type fused salt electrolytic cell was operated in the normal manner to produce sodium, using a fused mixture of calcium chloride and sodium chloride as electrolyte. While the cell was continuously maintained in operation, about 2% by weight of the electrolyte was removed from the cell and in its place was introduced about 1.5% by weight of the original electrolyte, of a salt mixture consisting of about 18% by weight of calcium oxide, 50% by weight of calcium chloride and 32% by weight of sodium chloride, together with sufficient additional sodium chloride to bring the molten electrolyte up to its original level. During the subsequent operation of the cell, the electrolyte was maintained at an approximately constant level by the addition of sodium chloride as required.

At the end of one hour and hourly thereafter, for a period of ten days, the above described removal of electrolyte and replacement with the calcium oxide-salt mixture was carried out. The data tabulated below gives the results obtained from two typical runs and the average of the results obtained over the ten-day period:

| Sample | Mixture added to cell | | | Mixture removed from cell | | |
| --- | --- | --- | --- | --- | --- | --- |
| | CaO | CaCl₂ | NaCl | CaO | CaCl₂ | NaCl |
| | Percent | Percent | Percent | Percent | Percent | Percent |
| A | 17.9 | 47.8 | 34.3 | 0.09 | 58.2 | 41.7 |
| B | 17.4 | 50.0 | 32.6 | 0.14 | 59.5 | 41.2 |
| Average for 10 days | 18 | 50 | 32 | 0.1 | 59 | 40.9 |

The substantially oxide-free salt thus obtained was moulded into bricks and was fed as required together with suitable amounts of sodium chloride, to other electrolytic cells to produce sodium. During the ten-day period, sufficient of the substantially oxide-free salt mixture was produced to supply the entire calcium chloride requirements of thirty cells of the same size and capacity as the cell used to produce the mixture, over the same period of time.

During the 10-day period the cell used to produce the oxide-free salt mixture produced sodium at the rate of about 70 grams per kilowatt hour of electric current used. The graphite anode in this cell was corroded at the average rate of about 0.01 inch per day as compared with a cell utilizing substantially oxide-free electrolyte in which the graphite anode is corroded at an average rate of around 0.001 inch per day.

In its broader aspects my invention comprises the preparation of a salt mixture suitable for the fused salt electrolytic production of alkali metals or alkaline earth metals which is accomplished by electrolyzing a mixture of alkali metal chloride and/or alkaline earth metal chloride containing one or more oxides of the metal or metals, the chlorides of which it is desired to produce in the mixture being prepared. Thus, in order to prepare a mixture of calcium and sodium chlorides to be used in the fused salt electrolytic production of sodium or in order to produce anhydrous calcium chloride to be later mixed with sodium chloride to produce a suitable electrolyte for the production of sodium, I electrolyze a mixture of calcium oxide and fused calcium chloride and sodium chloride or a mixture of calcium oxide and fused calcium chloride, respectively. I prefer to carry out the process with a mixture of salts, since such mixtures ordinarily have lower melting points than a pure salt and hence are more easily electrolyzed. My method of preparing a salt mixture is especially advantageous when one of the components is hygroscopic, while the corresponding oxide is substantially non-hygroscopic. For example, either lime or calcium hydrate may be added to a fused salt bath and electrolyzed with little or no trouble, while on the other hand calcium chloride must be substantially competely dehydrated before it can be added to a fused salt electrolyte. My process enables the anhydrous calcium chloride to be made efficiently and economically from the oxide, while at the same time and during the operation of the same process, sodium and/or calcium is produced in material quantities.

In an establishment where a number of fused salt electrolytic cells are operated, my process operated in one cell will produce sufficient salt mixture to maintain a number of other cells of approximately the same capacity in operation. Hence, in such an establishment the disadvantages due to the formation of oxygen in my process are reduced to a minimum, as far as the total production of chlorine is concerned; that is, only a small part of the total chlorine produced will contain oxygen. As is well known in the art, fused salt electrolytic cells have a certain life period near the end of which their efficiency decreases chiefly because of corrosion of the parts. I prefer to use my process in such cells near the end of their life period in order to minimize the loss due to anode corrosion by the liberation of oxygen in my process.

I am aware that processes have been proposed heretofore whereby metals are produced by fused salt electrolysis wherein an oxide of the metal to be produced is utilized as the raw material entering the fused salt bath. My process is not to be confused with these prior methods of obtaining a metal from its oxide, which processes do not result in the preparation of oxide-free, anhydrous salt mixtures. Furthermore, the purpose of my invention is not to produce metals from their oxides, but to produce a substantially oxide-free salt mixture from an oxide and a salt, in order to produce a mixture which may in turn be separately electrolyzed to produce a metal, preferably a metal other than that of the oxide used, and an oxygen-free halogen gas.

My invention is not restricted to the conversion of calcium oxide to calcium chloride but is also applicable to the conversion of the oxides of the other alkaline earth metals, i. e. barium and strontium and the alkali metal oxides to the respective chlorides. In the appended claims the term "alkaline oxide" is used to designate oxides which have a distinctly alkaline reaction when hydrolyzed, namely the oxides of the alkali and alkaline earth metals.

I claim:
1. A process for producing an alkali metal com- prising electrolyzing a fused electrolyte comprising an alkali metal chloride, alkaline earth metal chloride and an alkaline earth metal oxide until the electrolyte is substantially free from oxide, removing a portion of the oxide-free electrolyte, adding in its place alkaline earth metal oxide together with alkaline earth metal chloride and alkali metal chloride and continuing the electrolysis.

2. A process for producing an alkali metal comprising electrolyzing a fused electrolyte comprising an alkali metal chloride, calcium chloride and calcium oxide until the electrolyte is substantially free from oxide, removing a portion of the oxide-free electrolyte, adding in its place calcium oxide together with alkaline earth metal chloride and alkali metal chloride and continuing the electrolysis.

3. A process for producing sodium comprising electrolyzing a fused electrolyte comprising sodium chloride, calcium chloride and calcium oxide until the electrolyte is substantially free from oxide, removing a portion of the oxide-free electrolyte, adding in its place calcium oxide together with calcium chloride and sodium chloride and continuing the electrolysis.

4. A process for producing an alkali metal comprising electrolyzing a fused electrolyte comprising an alkali metal chloride, alkaline earth metal chloride and an alkaline earth metal oxide until the electrolyte is substantially free from oxide, removing a portion of the oxide-free electrolyte, adding in its place alkaline earth metal oxide together with alkaline earth metal chloride and alkali metal chloride and continuing the electrolysis and separately fusing and electrolyzing the said oxide-free electrolyte to produce alkali metal and substantially oxygen-free chlorine.

5. A process for producing sodium comprising electrolyzing a fused electrolyte comprising sodium chloride, calcium chloride and calcium oxide until the electrolyte is substantially free from oxide, removing a portion of the said oxide-free electrolyte, adding in its place calcium oxide together with calcium chloride and sodium chloride and continuing the electrolysis and separately fusing and electrolyzing the said oxide-free electrolyte to produce sodium and substantially oxygen-free chlorine.

ROBERT EDWIN HULSE.